United States Patent [19]

Jeck

[11] 4,325,014
[45] Apr. 13, 1982

[54] AUTOMATIC CONTROL UNIT FOR A WIND-FOLLOWING ROTOR

[76] Inventor: Richard K. Jeck, 23700 Eli La., Gaithersburg, Md. 20760

[21] Appl. No.: 111,592

[22] Filed: Jan. 14, 1980

[51] Int. Cl.³ .............................................. G05B 5/01
[52] U.S. Cl. .................................... 318/614; 318/624; 318/621; 318/566; 318/286; 318/369; 318/372; 318/447; 318/465; 318/489; 318/644; 318/648; 318/675; 73/189
[58] Field of Search ............... 318/644, 648, 489, 624, 318/611, 621, 447, 286, 282, 614, 369, 372, 465, 675, 566; 73/188, 189

[56] References Cited

U.S. PATENT DOCUMENTS

| | | | |
|---|---|---|---|
| 2,586,010 | 2/1952 | Divoll | 318/644 |
| 3,239,735 | 3/1966 | Raider et al. | 318/624 |
| 3,293,861 | 2/1960 | Colt | 73/189 |
| 3,641,815 | 2/1972 | Fassett | 73/188 |
| 3,991,624 | 11/1976 | Davies | 73/189 |

Primary Examiner—J. Truhe
Assistant Examiner—Eugene S. Indyk
Attorney, Agent, or Firm—Haight, Rosfeld & Noble

[57] ABSTRACT

A control unit for automatically controlling the angular position of a reversible, motorized device, such as an antenna rotor, in response to a signal from an external sensor, such as a potentiometer coupled to the rotating shaft of a windvane. The unit includes integrated circuits and other electronic components for monitoring the windvane signal and for activating the rotor, as necessary, to maintain its alignment with the sensed wind direction. The unit also comprises means for providing: a no-response zone of adjustable width about the momentary, average wind direction; an adjustable, time delayed response to changes in wind direction; an automatic reversal of rotation if the rotor approaches the ±180° position while searching for the wind direction; an automatic disabling of the rotor for windspeeds less than a selectable, threshold value.

12 Claims, 5 Drawing Figures

AUTOMATIC CONTROL UNIT FOR A WIND-FOLLOWING ROTOR

BACKGROUND OF THE INVENTION

The present invention relates to automatically controlled positioning devices in general and in particular to means for automatically controlling a reversible, motorized device, such as an antenna rotor, in response to an electronic signal from an external sensing device, such as a potentiometer coupled to the rotating shaft of a windvane.

In certain outdoor, scientific, engineering, or meteorological field tests or experiments it is necessary to use air sampling devices or other instruments which must be kept facing into the ambient wind during the sampling interval. Such instruments include, for example, some types of aerosol particle counters and visibility measuring instruments. When the ambient wind changes direction a means must be provided for rotating the instruments into the new wind direction. The problem becomes especially acute if it is desired to operate wind sensitive instruments on a long term, unattended basis, or if the wind is unusually variable in direction. In these cases it is convenient, and perhaps even necessary, to employ a means for automatically rotating the instruments into the changing wind in order to collect a sufficient quantity of valid data.

Existing means for automatically rotating various devices into the wind are limited to methods whereby the rotatable device is directly coupled to a wind driven vane. Such means are, of course, commonly used to keep windmills and propeller type anemometers facing into the wind. However, for heavy instrument packages as envisioned here, these means have at least the following distinct disadvantages:

First, the required vane size increases as the size or weight of the instrument package and platform increases. It is not uncommon for a hundred pounds or more of equipment to be installed on a rotatable platform of the type envisioned. Power and data cables leading to the instruments usually provide some resistance to rotation as well as some restoring torque which tends to rotate the system back as the cables get wound up around the platform or support pole. Thus, with a heavy instrument load or unfavorable power/data cable constraints, an impractically large vane may be required, especially if alignment is necessary in relatively low wind conditions.

Second, with a vane controlled platform the aforementioned cables can easily become wrapped around the support pole or other nearby structures, especially in highly variable wind conditions. Needless to say, damage to the cables or instruments may result. If some kind of stops are provided to keep the platform from rotating more than 360°, for example, then the usefulness of the rotating platform is limited. In some situations the stops will prevent the platform from rotating the extra amount it needs to become properly aligned. This results in lost data or else it requires an operator to be in attendance to correct the situation.

Third, a large vane would also be impractical in cases where there are unfavorable space constraints due, for example, to other nearby objects.

Devices such as servomechanisms or other means which have been used successfully in automatic steering applications could be adapted to the present application. However, without additional modifications or improvements these means have at least the following disadvantages:

First, unless the device prevented rotation by more than 360° or so, there would be the previously mentioned danger of winding up the instrument cables around the support pole or other nearby objects. Even then, the stops may prevent the device from achieving proper alignment with the wind.

Second, in calm, low, or intermittent winds the device may continually "hunt" for a non-existent wind.

Third, in erratic or turbulent winds the device may "chatter" or try to respond to rapid fluctuations in wind direction about some mean value.

BRIEF SUMMARY OF THE INVENTION

The general purpose of the present invention is to provide a means for automatically controlling the angle and direction of rotation of the output shaft of a reversible gearmotor in response to sensed changes in the local wind direction, and for overcoming all the aforementioned disadvantages of the prior art.

Accordingly, it is an object of the present invention to provide a means for using an electrical signal, such as the voltage readout from a potentiometer that is coupled to the rotating shaft of a windvane, to control the angle and direction of rotation of a gearmotor shaft such that a preselected point on the periphery of the shaft is always kept in alignment with the wind direction as sensed by the windvane.

Another object is to provide an adjustable dead zone about the momentary, average wind direction such that, in effect, the angular sensitivity of the control circuit can be increased or decreased by narrowing or widening, respectively, the dead zone.

A further object is to automatically deactivate the gearmotor and reset all control circuit functions to their unactivated state whenever, and as long as, the windvane is oriented within the selected dead zone.

Still another object is to provide an adjustable time delay between excursions of the wind direction outside the selected dead zone and the activation of the gearmotor, thereby avoiding unnecessary activation of the gearmotor when the wind direction wanders only momentarily out of the dead zone.

Yet another object is to cause the gearmotor to automatically reverse its direction of rotation in the event that the gearmotor shaft reaches the ±180° angular position before coming into alignment with a pursued wind direction.

Yet another object is to automatically release a brake (when one exists) on the gearmotor, such as in antenna rotors, when a change in wind direction calls for a rotation.

Still another object is to provide an appropriate delay time (two seconds, for example) before the brake on the gearmotor is re-engaged after the rotating system has come into alignment with the new wind direction in order that heavy loads may coast to a stop within the dead zone before being secured into place by the brake.

A further object is to automatically deactivate the gearmotor and maintain the control circuit functions in an unactivated state whenever, and as long as, the sensed windspeed is below a selectable threshold value in order that the rotor will not "hunt" should the vane be found outside the selected dead zone in low or nonexistent windspeeds.

These and other objects and advantages of the invention will appear more fully from consideration of the detailed description, which follows, in conjunction with the accompanying drawing wherein one embodiment of the invention is illustrated. It is to be expressly understood, however, that the drawing is for the purposes of illustration and description and is not to be construed as defining the limits of the invention.

DETAILED DESCRIPTION OF THE INVENTION

FIGS. 1–5 include an embodiment of the invention. In this embodiment, the invention, shown in the block diagram of FIG. 1 and hereafter referred to as the automatic control unit (ACU) 14, is used with an aerovane 12 (a windspeed and direction sensor), a commercially available antenna rotor 18, and its accompanying remote control unit 16.

The basic principle of the complete operating system, of which the invention is a part, is as follows. The aerovane 12 is mounted on an instrument platform (IP) (not shown) or other attachment that is connected to, and rotates with the rotor 18. When a preselected, but arbitrary, reference direction on the IP or the rotor shaft is aligned with respect to the sensed wind direction, a null condition is recognized by the ACU and the rotor 18 is left unenergized. When the wind direction shifts away from the reference direction by an amount that is greater than a selectable, preset threshold angle, the ACU responds by energizing a relay which overrides the appropriate manual control in the RCU 16. The rotor is thus activated to rotate either in the clockwise (CW) or counter clockwise (CCW) direction as necessary to re-establish alignment of the rotor shaft or IP with the new wind direction.

The RCU 16, being commercially available and normally purchased along with the antenna rotor 18, is not itself a part of the invention as described in the present embodiment, but it is a part of the total operating system, as is the ACU. In other embodiments, the functional equivalent of the RCU could be included in the same housing as the ACU, if desired. Thus, a brief description of the operating principle of a typical RCU is given as follows in order that the details of operation of the ACU and the complete operating system may be clearly understood.

Figure 1:
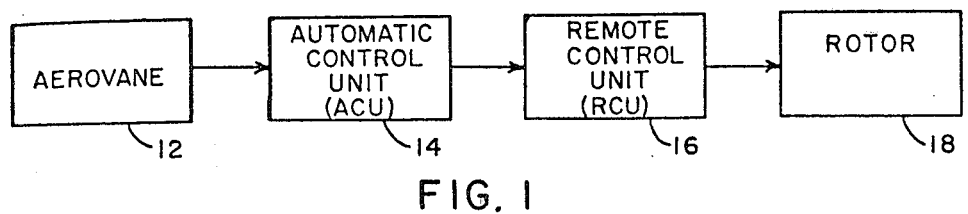
FIG. 1 is a block diagram showing the relationship of the illustrative embodiment of the invention (the automatic control unit (ACU)) with other members of a complete operating system.
Figure 2:
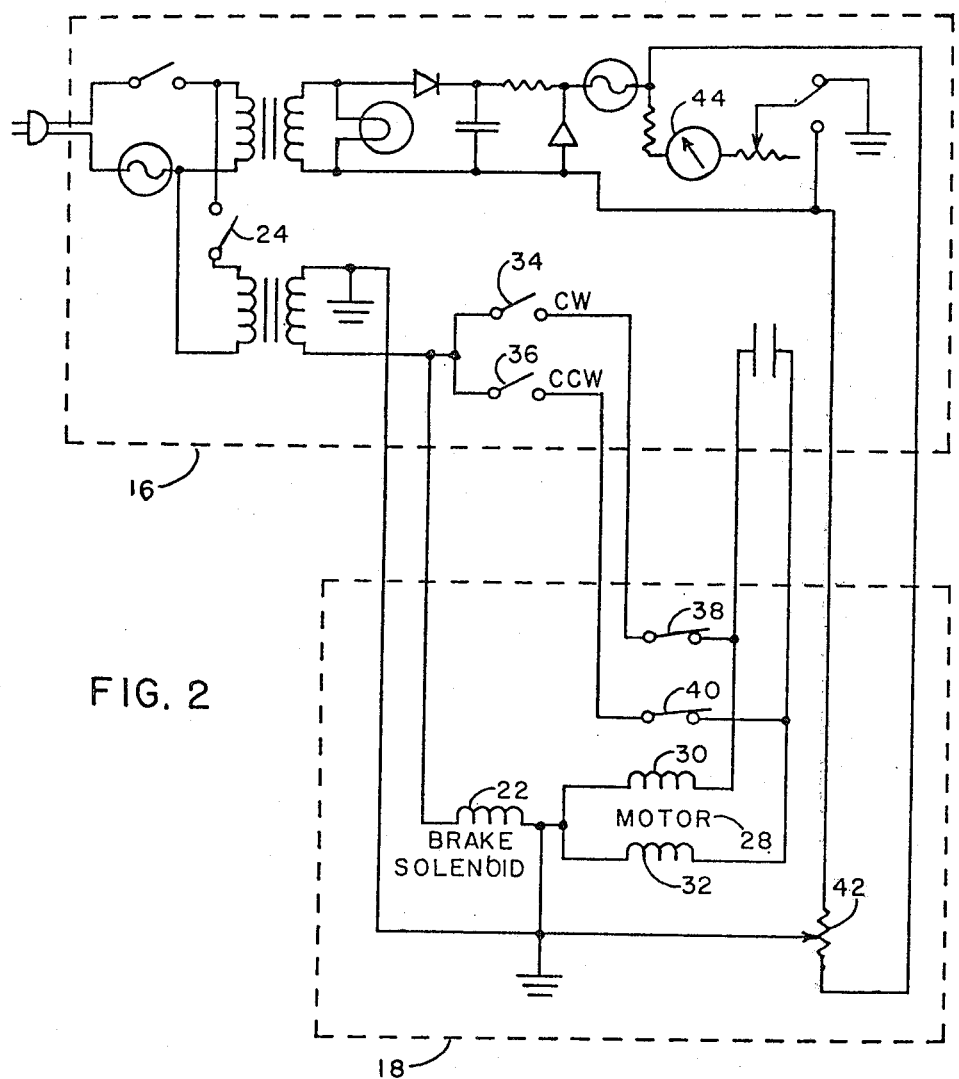
FIG. 2 is a schematic wiring diagram of a commercially available remote control unit (RCU) chosen for use in the illustrative, operating system shown in FIG. 1. The circuit is taken from the owners manual for the CDE brand, Ham II model of antenna rotor system.

Referring to FIG. 2, the rotor unit 18 contains a solenoid 22 which, when energized by the closing of switch 24 in the RCU 16 by the operator, releases a brake in the rotor unit and frees the motor 28 to rotate. The motor contains two independent drive windings 30 and 32. Winding 30 causes the motor shaft to rotate CW when energized by the closing of switches 24 and 34 in the RCU. The other winding 32 causes CCW rotation when energized by the closing of switches 24 and 36. There are two limit switches 38 and 40 which are opened mechanically whenever the rotor has rotated to about 180° CW or CCW, respectively, from its midway position. When either of these limit switches are opened, current to the associated motor winding is interrupted and the motor stops. The wiper contact of the potentiometer 42 rotates with the rotor and controls the deflection of the pointer on the rotational position indicating meter 44 in the RCU. The meter scale is calibrated in degrees or directions of the compass and provides a continuous, remote indication of the rotor orientation.

Similar to the requirement for an antenna rotor and RCU to make up a complete operating system, an aerovane is also needed to provide electrical output signals proportional to the sensed windspeed and wind direction. The present, illustrative embodiment of the ACU assumes an aerovane such as the Naval Research Laboratory Magnetic Anemometer (U.S. Pat. No. 3,336,802). In this particular aerovane model (not shown), the vane is linked to the wiper of a one turn potentiometer and the propeller, through a gear system, momentarily closes a switch once every sixty revolutions. Thus, with a fixed voltage impressed across the potentiometer, wind direction information can be obtained by measuring the voltage difference between the wiper contact and one of the two end contacts. Windspeed information is obtained either by counting the number of propeller switch closures per unit time or by timing the interval between successive switch closures. It is to be understood that other types of aerovanes may be readily employed as well with only minor changes in the logic circuitry of the ACU, as will be indicated in the following teachings.

Figure 3:
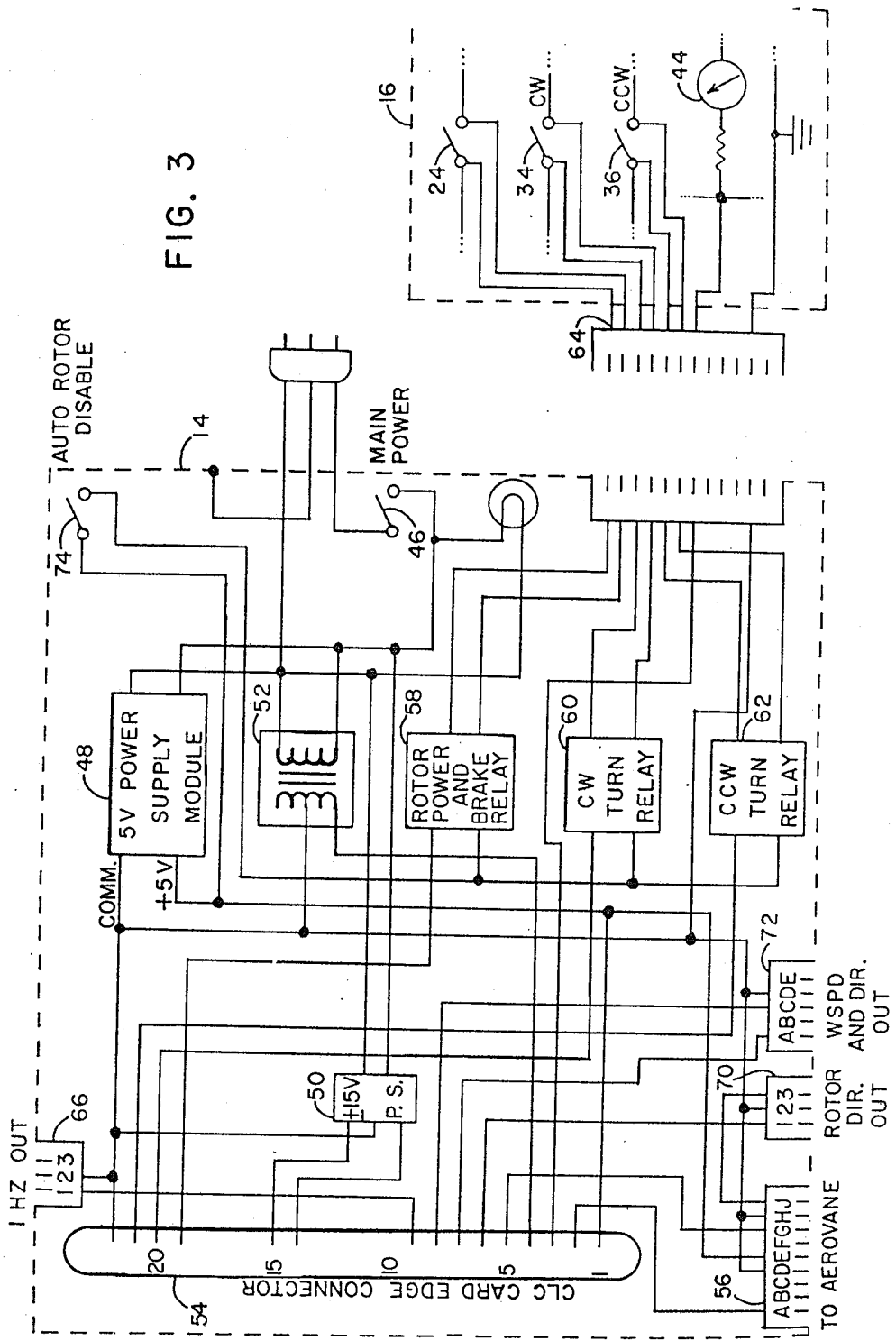
FIG. 3 shows the interconnections between power sources, relays, card edge connector of a control logic card (CLC), and various cable connectors and switches in the ACU. Also shown are wiring additions required in the RCU in order to connect the brake and motor control relays of the ACU in parallel with the corresponding relay switches in the RCU.

Referring now to FIG. 3, input power from an appropriate external source, such as a 60 Hz, 110 volt line, is routed via a power off/on switch 46 to the input terminals of a 5 v dc power supply module 48, a ±15 v dc power supply module 50, and a 110 v-to-7.5 v step-down transformer 52.

The output from the 5 v dc supply is furnished to the edge connector 54 of the control logic card (CLC), a direction readout potentiometer (DRP) of the aerovane (via pin E of connector 56), and to one terminal of the activating coils of the three relays 58, 60, and 62 which are used to energize the brake, and the CW and CCW motions, respectively, of the rotor.

The switch contacts of these three relays are connected, via cable 64, in parallel with the corresponding, manually operated switches for the brake, CW and CCW rotor controls in the RCU.

The output lines from the ±15 v dc power supply 50 are fed only to the CLC for use in powering a digital-to-analog converter in the wind-speed reckoning portion of the circuitry.

The 7.5 v ac output from the step down transformer 52 is fed to the CLC for use as the time base for a digital timer in the portion of the circuitry (in this illustrative embodiment) that provides a preset delay in the response of the rotor activating relays to a change in wind direction. The 1 Hz, TTL compatible signal generated by the digital timer on the CLC is brought out to connector socket 66 as an auxiliary convenience output in the preferred embodiment, for use in clocking other devices such as time markers on a chart recorder, external digital clocks, etc.

In addition to the aforementioned, parallel switch connections, cable 64 brings a signal from the DRP 42 in the rotor unit 18 (FIG. 2) to the CLC. This signal is used in the portion of the CLC circuitry that reverses the rotor direction whenever the limit switches are approached without the rotor reaching alignment with the wind direction.

The signal voltage from the rotor DRP 42 is also reduced in magnitude on the CLC and then brought out to pin 1 of auxiliary connector 70 for use in monitoring or recording the rotor orientation on a chart recorder or data logging system.

Connector 72 is also an auxiliary convenience connector which brings out on pin A an analog signal containing windspeed information. An input line on pin C of 72 is provided for resetting the digital, propeller turns counter on the CLC from an external control, if desired.

Finally, a toggle switch 74 labelled "AUTO ROTOR DISABLE" is provided so that the automatic control features can be disabled, if desired. This switch is in series with the 5 v supply to the coils of the brake and rotor power relays in the ACU. When the switch 74 is closed, all control relays 58, 60 and 62 are enabled. In the "DISABLE" (switch open) position these relays are disabled so that the rotor will not function unless controlled manually with the RCU. In either case, however, the windspeed and other auxiliary output signals are still available and can be monitored.

Figure 4:
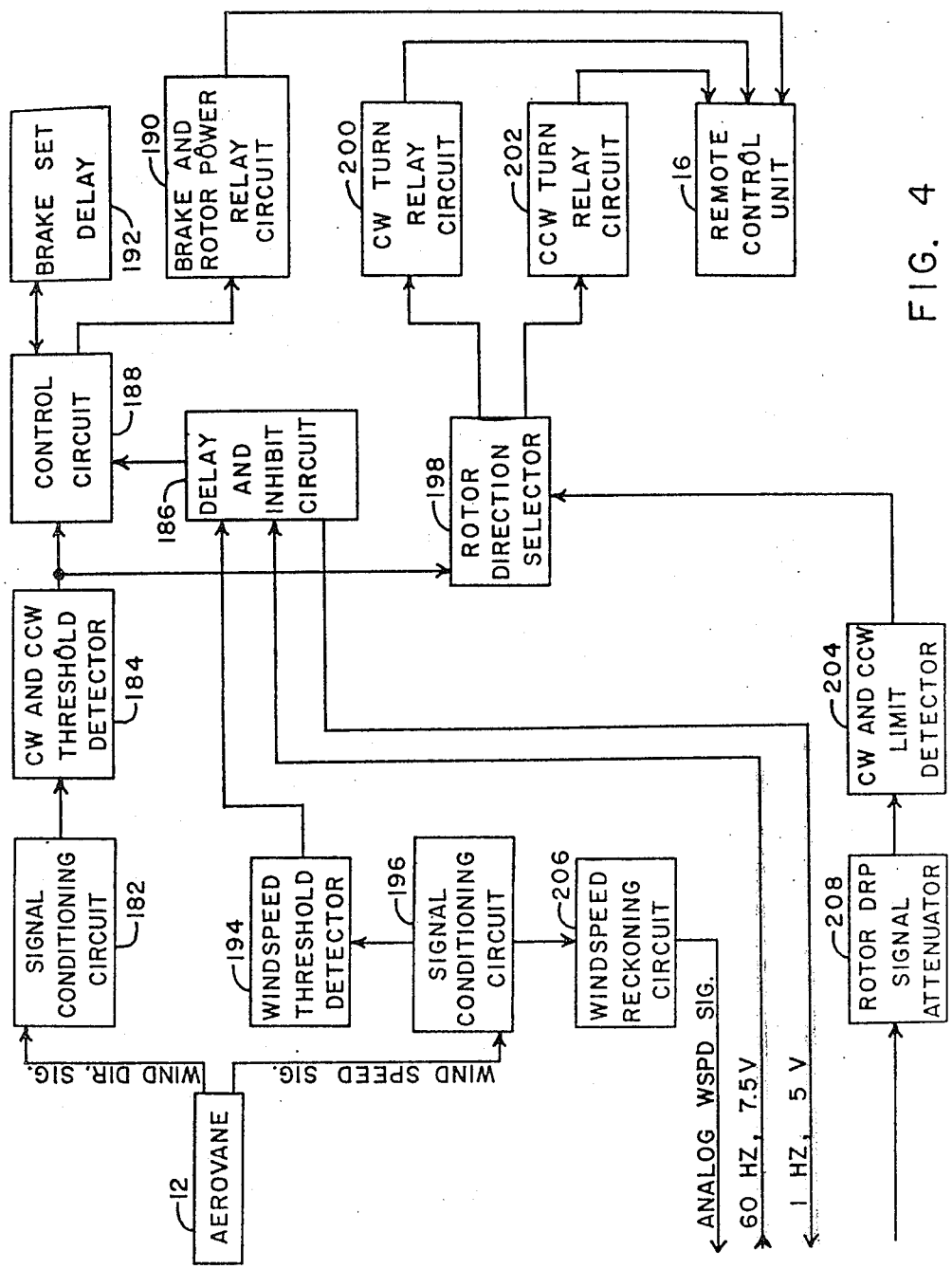
FIG. 4 is a block diagram showing the relationship between the various functional subcircuits in the ACU.
Figure 5:
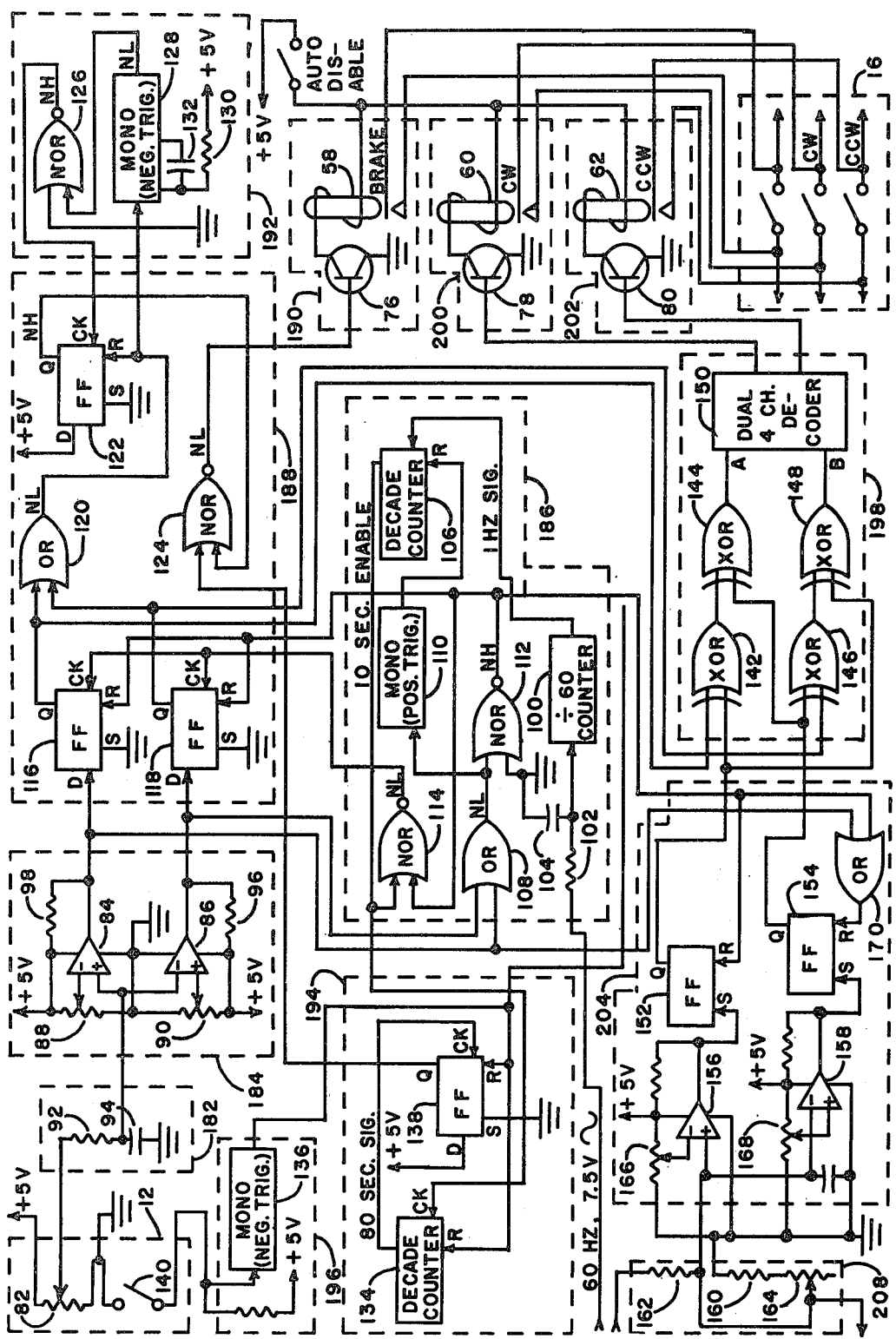
FIG. 5 shows the interconnections between the various components on the CLC in the ACU.

Referring now to FIG. 4 and FIG. 5, the principle of operation of the various subcircuits of the CLC is described. Except for the components already mentioned, most of the signal processing and control electronics are located on the plug-in CLC which mates with the card edge connector 54 shown on the left hand side of FIG. 3. The components on this card and their interconnections are shown schematically in FIG. 5. Except for the three transistors 76, 78 and 80, and several resistors and capacitors, the components are all standard, commercially available analog or digital integrated circuits (ICs). Typical choices for these ICs and the other components are listed in TABLE 1.

a. Aerovane Direction Monitoring Circuitry and Adjustable Dead Zone Feature

The 5 v dc supply voltage is applied to the DRP 82 in the aerovane 12 via pin E of connector 56 (FIG. 3). The fixed base of the aerovane is oriented such that when the rotatable portion of the vane is pointing in some chosen reference direction (e.g., North, or toward the bow of a ship, or into the prevalent wind direction) the wiper of DRP 82 is exactly midway between the ends of the DRP windings. With 5 v impressed across the DRP, the readout voltage from the wiper is then 2.50 v with the vane pointing in the reference direction. For a one-turn potentiometer, the angular sensitivity of the readout is 5 v/360° or 0.014 volts/deg. Thus, a 10° rotation to either side of the reference direction, for example, will change the readout from 2.50 v to either 2.36 v or 2.64 v.

The IC comparators 84 and 86 are the principal components in a CW and CCW threshold detector circuit 184. The comparators initiate a response if the direction readout voltage (DRV) from the wiper of the vane DRP deviates from 2.50 v by more than some preselected amount. Specifically, 84 is biased at its inverting input terminal to a selected voltage level $V_1 > 2.50$ v by means of potentiometer 88. The output of 84 will then remain "low" (i.e., 0v dc) until the DRV (applied to the non-inverting input of 84) exceeds $V_1$. When the DRV exceeds $V_1$ the output of 84 will go "high" (i.e., +5 v), and this change of state is used to initiate further responses culminating in an activation of the rotor, as described in detail in the following sections. Similarly, 86 is biased at its non-inverting input to a selected voltage level $V_2 < 2.50$ v by potentiometer 90. The output of 86 then remains low until the DRV drops below $V_2$.

The values of $V_1$ and $V_2$ determine the limits of a "dead zone" or error band about the reference direction. Thus, if it is desired that there be no response by the ACU as long as the wind direction remains within $\pm 10°$ of the reference direction, for example, the values of $V_1$ and $V_2$ would be set at 2.64 v and 2.36 v, respectively, according to the angular sensitivity computation shown above. Under these conditions the output of both comparators 84 and 86 will remain low as long as the vane remains within the error zone, and no action is initiated to cause rotation of the rotor.

If the vane rotates by more than 10° in the CW direction (as viewed from above the vane), the output of 84 will go high and initiate a sequence that will cause the rotor to turn CW to bring the base of the vane and the instrument platform into alignment with the new wind direction. Similarly, a movement of the vane by more than 10° in the CCW direction initiates a sequence leading to a CCW rotation of the rotor.

The combination of resistor 92 and capacitor 94 on the output line of the vane DRP serves as an integrating circuit or signal conditioning circuit 182 to suppress noise spikes induced onto the comparator input lines from the action of the relays.

The 5 k resistors 96 and 98 on the output terminals of comparators 84 and 86 are pull-up resistors to ensure that the amplitude of the high state output of these comparators is compatible with the input requirements of the CMOS digital ICs which they feed in this embodiment of the invention.

b. Time Delay Feature

In order that momentary fluctuations in wind direction or turbulent oscillations about the average wind direction do not actuate the rotor, a selectable time delay is built in as follows.

The 7.5 v, 60 Hz voltage from the step down transformer 52 (FIG. 3) is sent to the divide-by-60 counter 100 in the delay and inhibit circuit 186. The input conditioning network of resistor 102 and capacitor 104 is called for in the MC 14566 device application notes. The output of 100 is a 5 v, 1 Hz squarewave pulse train which is fed to decade counter 106. The 1 Hz signal is also brought out on pin 1 of connector 66 (FIG. 3) as a convenience signal for use in timing other, external devices as mentioned previously.

It can be seen that when either comparator 84 or 86 goes high, the logical "OR" gate 108 goes high too and initiates a momentary pulse from monostable multivibrator 110 which resets counter 106 to the beginning of its 10 sec countdown function. If before the ensuing 10 seconds have elapsed the vane returns to the allowed error zone, even momentarily, then the activated comparator, 84 or 86, will go low accordingly. This causes OR gate 108 to return to its normally low (nl) condition and, in turn, NOR 112 goes to its normally high (nh) state. The output of NOR 112 is fed to NOR 114 as well as to the reset lines of IC flip flops (FF) 116 and 118 in the control gate circuit 188. A high from NOR 112 on the input to NOR 114 prevents NOR 114 from going high when the "10 sec" pulse arrives from counter 106. Since NOR 114 must go high before any of the other sequences can take place that lead up to an actuation of the rotor, the control circuitry consisting of OR 108, NOR 112, and NOR 114 serves effectively to shut down the activating sequence if the vane does not remain oriented outside of the error zone for at least 10 seconds.

Delay times other than 10 seconds can easily be selected by using other output ports on counter 106 or by using other types or combinations of IC counters. It should also be understood that the time delay feature can also be accomplished by a variety of other means known to those practised in the art of electronics, and the present means described in this illustrative embodiment is but one of the possibilities.

If either of comparators 84 or 86 remains high for at least the length of the delay time, then NOR 114 will go high at the end of the delay period and will allow a high on the "Q" output of either FF 116 or 118, depending on which of the two comparators has been activated by the vane. The selection of FF 116 or FF 118 occurs in the following way. The outputs of comparators 84 and 86 are connected to the "D" input of FF 116 and FF 118, respectively. Either 84 or 86, but not both, will be high when the vane is outside of the error zone. Thus the "D" input of one of the FFs will be high while the other remains low. NOR 114 is connected to the "clock" (CK) input terminal of both FFs. The operation of these FFs is such that when the CK input goes high, the Q output is forced to assume whatever state (high or low) is present on the "D" input at that moment. The Q output will then hold that state independently of what happens thereafter on the D input until another CK pulse is received or a (high) pulse is received on the reset line. Upon receipt of a reset signal the Q output is forced to the low state. Thus, when the CK inputs are activated by NOR 114 the Q output of the FF which sees +5 v on its D input will go high while the other FF stays low.

A high output state from FF 116 is then used to establish a further sequence of events described below to cause the rotor to turn CW as long as the Q output of FF 116 remains high. Similarly, a high Q output on FF 118 leads to a CCW rotation. Once set high, the Q output from either of the FFs will remain high until a reset pulse is received from NOR 112. This occurs whenever the vane rotates back into the error zone and causes comparators 84 or 86 to return low causing OR 108 to go low and NOR 112 to go high.

c. Automatic Brake Release Feature

The digital IC components which respond to a high Q output from FF 116 or FF 118 and which serve as further control elements for the rotor brake release relay 58 are OR 120, FF 122, NOR 124, NOR 126, and the monostable multivibrator 128. The two input lines of OR 120 are fed by the Q output of FF 116 and FF 118. Thus the output of OR 120, which feeds the reset line of FF 122, is nl when the vane is within the error zone. When the wind changes direction, the output of OR 120 still remains low until the delay period is successfully completed, at which time the Q output of either FF 116 or FF 118 goes high and drives OR 120 high. This resets FF 122 such that its nh, Q output goes low. Since FF 122 feeds one of the two inputs to NOR 124, the output of the latter gate will go high if its other input is also low. The second input to NOR 124 comes from a windspeed threshold detecting circuit described later. For windspeeds above a selectable minimum value, this control line will be low. Thus, when all the previously described conditions are met and the vane is validly calling for a rotation, NOR 124 will go high and cause transistor 76 to conduct into saturation. This transistor serves as an electronic switch in series with the energizing coil of the brake release relay 58 located in the ACU (FIG. 3).

When transistor 76 conducts, the brake release relay 58 is energized and closes its pair of contacts which are connected (via cable 64, FIG. 3) in parallel with the manually operable brake release switch 24 in the RCU. As was explained in the earlier section describing the RCU and the rotor unit, when this switch is closed another relay in the rotor housing is energized to release the brake and allow the motor, which is energized separately, to turn. Once energized, the brake release relay 58 will remain energized until the Q output of FF 122 goes high and drives NOR 124 low.

d. Automatic Delay for Brake Re-engagement

The owners manual for the CDE Ham II rotor system cautions that after the rotor has turned the desired amount, the motor should be de-energized two seconds or more before the brake is engaged. This is to allow any heavy loads that the rotor may be moving to coast to a stop before locking the motor and load into position with the brake. Otherwise, bringing a heavy load to a stop by sudden braking could damage the brake or rotor system. When the RCU is operated manually, this two second delay is accomplished simply by releasing the motor control switch two seconds or so before releasing the brake switch.

In order to accomplish this same kind of function when operating automatically with the ACU, a brake set delay circuit 192 is added. The output of monostable multivibrator 128 is nl and is connected to the CK input terminal of FF 122 via NOR 126. Following a negative-going transition on its input, the output of MONO 128 will go high for an interval determined by the time constant associated with the RC combination of resistor 130 and capacitor 132. The negative-going trigger comes from OR 120 and occurs whenever the vane rotates back into the error zone. This causes the output of OR 120 to drop back to its nl condition. During the interval that MONO 128 is high, NOR 126 will be forced low. At the end of this adjustable delay (the RC time constant of 130 and 132 is set for two seconds in the illustrative embodiment), MONO 128 will return to its nl condition and force NOR 126 to return to its nh state. This positive going transition on the output of NOR 126, and therefore on the CK input of FF 122, causes the Q output of FF 122 to go high since the D input of FF 122 is tied high. This causes NOR 124 to go low, stopping conduction in transistor 76 and resulting in the setting of the brake.

e. Automatic Deactivation of ACU in Low Windspeeds

In calm wind conditions it is possible that the vane may be moved out of the error zone by accident or by a momentary gust of wind. In order to avoid the situation where the rotor responds by continuously rotating in a futile attempt to realign the vane with a nonexistent wind, a threshold windspeed detector 194 based on IC decade counter 134 is included in the ACU. This IC tallies 10 sec intervals coming from counter 106. However, the output of the anemometer is connected via MONO 136 in the windspeed signal conditioning circuit 196 to the reset terminal of counter 134. Thus, for each closure of the propeller driven switch contact 140 (in the type of anemometer used in the illustrative embodiment of the ACU), counter 134 is reset to a count of zero. The output signal from 134 is taken from one of the available countdown taps such as the $Q_4$ terminal which goes high at the end of an 80 second interval. As long as the anemometer switch closures occur more frequently than once per 80 sec, in this example, the sequences described in the preceding paragraphs will not be inhibited and the rotor will be activated to follow the vane as required.

However, if the windspeed is so slow that no switch closures are forthcoming, counter 134 will reach a count of 80 sec. The $Q_4$ output of 134 then drives FF 138 high which, in turn, prevents NOR 124 from going high. This inhibits the energizing of the brake release relay 58. This preventative condition will remain in effect until a switch closure signal is received from the propeller (anemometer) indicating that the wind has picked up to the threshold speed. When this occurs, MONO 136 resets counter 134 to zero and also resets FF 138 to a non-interfering, low output state.

The threshold windspeed is selectable and is chosen as follows. The anemometer used with the illustrative embodiment of the ACU is geared internally such that a switch closure occurs once every 60 revolutions of the propeller. The relationship between switch closures and windspeed is given by Time(sec) between closures = 40/*wspd*(knots).

If the $Q_4$ (80 sec) output terminal of counter 134 is used, then from this equation it is seen that a windspeed of ½ knot must be maintained in order to reset the counter before 80 sec have passed. Similarly, the windspeed thresholds corresponding to the $Q_3$ (40 sec), $Q_2$ (20 sec), and $Q_1$ (10 sec) intervals are 1, 2, and 4 knots, respectively.

It is to be understood that with other types of anemometers, such as those with a dc output voltage that is proportional to the wind-speed, other types of threshold detection circuits such as voltage comparators would be employed.

f. Circuitry for Controlling Direction of Gearmotor Rotation

When the wind changes direction and gives rise to a valid call for rotation from the rotor, the motor is energized simultaneously with the activation of the brake release relay 58. The direction of motor rotation is determined by which of the two motor control relays 60 or 62 is energized. The activating coils of the CW and CCW motor relays are connected separately via an intermediate network of ICs in the rotor direction selector 198 to the Q output of FF 116 and FF 118, respectively. The direction selector 198 consists of four Exclusive-OR (XOR) gates 142, 144, 146, and 148, and a dual, 4-channel decoder IC, 150. The XOR gates permit the use of override signals to reverse the direction of rotation if the rotor reaches the limits of rotation near ±180° from its center position. This feature will be explained in the following section. The purpose of the 4-channel decoder 150 is to prevent both the CW and CCW relays from being energized simultaneously, as could otherwise happen when the relays, or other sources of noise spikes, accidentally trip an additional FF such as FF 152 or 154.

Normally the inputs to all the XOR gates 142, 144, 146, and 148 are low until the vane actuates FF 116 or FF 118. For example, if FF 116 goes high then XOR 142 and, in turn, XOR 144 are caused to go high. The 4-channel decoder 150 operates such that a high on its "A" input line from XOR 144 will activate the decoder output terminal that feeds transistor 78. The CW relay 60 is then energized and the rotor turns in the CW direction until the co-rotating error zone is brought into alignment with the wind direction. A call for a CCW rotation activates XOR 146, XOR 148 and input "B" of the decoder 150 and results in the energizing of the CCW relay 62 via transistor 80.

The decoder is also wired so that neither transistor 78 nor 80 is activated if a noise spike or other transient results in both the A and B inputs of the decoder being high at the same time.

g. Circuitry to Reverse Rotor Direction at the Limits of Rotation

Should the vane call for a rotor movement beyond the ±180° limit in either direction from its center position, the rotor's approach to the limit will be sensed either by comparator 156 or 158 from the voltage readout on the DRP 42 (FIG. 2) in the rotor unit itself.

The resistance divider network consisting of resistors 160, 162, and 164 on the input lines to comparators 156 and 158 is used to reduce the 0–13 v dc signal coming from the DRP 42 to a convenient span such as 0–3.6 v corresponding to the 360° rotational range. In the illustrative embodiment of the ACU, comparators 156 and 158 are biased to threshold levels of 3.5 v and 0.2 v by adjusting potentiometers 166 and 168 in the CW and CCW limit detector 204. Then, for example, if the rotor has not brought the vane into alignment with the wind by the time the rotor nears the CCW limit (i.e., at the time the voltage readout from DRP 42 drops to 0.2 v) then comparator 158 goes high and sets the Q output of FF 154 to the high state. This signal then inputs to XOR 146 along with the already existing high input from FF 118. Up until this time the latter signal had kept XOR 146 and XOR 148 high and thus energized the rotor for CCW rotation. With FF 154 high now, XOR 146 and XOR 148 will go low. At the same time XOR 144 will go high due to the presence of the high from FF 154 at its input. Thus, what was originally a normal CCW rotation will be changed to a CW rotation which will continue until the error zone of the vane is brought into alignment with the wind.

An analogous sequence of events wil change a normal CW rotation to CCW when the rotor nears the CW limit and the DRP 42 signal, as modified by the rotor DRP signal attenuating circuit 208, exceeds the 3.5 v threshold set by potentiometer 166. Then comparator 156 and FF 152 will be activated to alter appropriately the output states of the XOR gates to result in a reversal of rotor motion.

h. Signal Conditioning Circuits for Supressing Noise Spikes

The OR gate 170 in the CW and CCW limit detector 204 was added to help the rotor get past the position where the vane crosses the gap in the windings of its DRP 82. This usually occurs when the wind direction is such that the rotor must reverse direction to find the wind. That is, in the case where a normal CW rotation is changed to a CCW rotation at the CW limit, OR 170, fed by the CW output signal of comparator 84 is found to be necessary in order to keep FF 154 reset until the gap in DRP 82 has been crossed. Otherwise, voltage transients occurring when the vane rotates the wiper through the gap in the DRP 82 will activate FF 154 and the dual, 4-channel decoder 150, seeing a high on both its A and B input lines, will cause the motor to stop. After the 10 sec delay period, the rotor would start turning again in the original CW direction until it hit the CW limit again. It would then come back to the DRP 82 gap where the sequence would repeat with the rotor never getting past the gap and thus never finding the sought after wind direction. This problem does not occur when the rotor is returning from the CCW limit. The problem appears to be due to a spike appearing on the nl "S" input to FF 154 when the DRP 82 gap is approached from the CW side. OR gate 170 successfully overrides spikes that would otherwise trip FF 154 to a high output state at the wrong time.

It was subsequently found that spikes could occur on the rotor DRP 42 line when the brake relay is energized. Since this line feeds comparators 156 and 158 in the CW and CCW limit detector 204, it was found that FF 154 could still be set high frequently, causing the XOR combination to mistakenly initiate a CW rotation instead of the needed CCW rotation. The addition of capacitor 172 on the input line to comparators 156 and 158 successfully suppressed these transients and ensured proper rotation.

i. Windspeed Reckoning Circuitry, 206

This circuitry is not essential and accordingly not shown in detail in the Drawing, but is included as a convenience since the anemometer used in this illustrative embodiment does not provide a readout that is directly proportional to the windspeed. As was mentioned in the previous description of the anemometer, the number of switch closures per unit time must be counted in order to determine the windspeed. This is accomplished by a binary counter whose output lines are routed, via signal conditioning inverters, to a digital-to-analog (DAC) converter. The DAC that was conveniently at hand when the illustrative embodiment was built is a type that has a current output rather than a voltage output. An op amp is used to convert the current output to a more practical voltage output as per the instructions in the DAC literature. With this arrangement, then, the output voltage may be sampled periodically and the voltage difference between successive samples can be related to the average windspeed between samples. A reset line is provided via pin C of connection 72 (FIG. 3) if it is desired to reset the binary counter to zero count after each sample.

| Typical Parts List for Components of the Control Logic Circuit (CLC) FIG. 5 | | | |
|---|---|---|---|
| Circuit Symbol or Callout No. | Component | Manufacturer | Manufacturers Part No. |
| XOR | Quad Exclusive-OR gate | RCA | CD4030AE |
| NOR | Quad, dual-input NOR gate | RAC | CD4001AE |
| OR | Quad, dual-input OR gate | Nat'l Semi. | MM74C32N |
| ÷60 counter | Industrial Time Base Generator | Motorola | MC14566CP |
| Mono 2 | | | |
| Decade Ctr. | Presettable UP/Down Counter | RCA | CD4029AE |
| FF | Dual "D" Flip Flops | RCA | CD4013AE |
| MONO | Dual Monostable Multivibrator | Nat'l Semi. | MM74C221N |
| 84,86,156,158 | Quad Voltage Comprators | Nat'l Semi. | LM339N |
| fixed resistors | DIP 5KΩResistance Network | Allen Bradley | 314A472 |
| variable resistors | 10 KΩtrimpots | | |
| 78,80 | Transistors, type 2N2219 | | |
| 76 | Transistor | Motorola | MJE1103 |
| 150 | Dual 4-channel decoder | Motorola | MC14539 |

From the foregoing description, one skilled in the art can easily ascertain the essential characteristics of this invention and, without departing from the spirit and scope thereof, can make various changes and modifications of the invention to adapt it to various usages and conditions.

What is claimed is:

1. Control apparatus for automatically controlling the angle and direction of rotation of the output shaft of a reversible motor as a function of a sensed fluid flow, said apparatus comprising:
   means for receiving a flow direction signal responsive to the direction of said fluid flow, said signal representing a function of the angular displacement of said fluid flow from a pre-determined flow direction;
   reference direction signal means for providing a direction reference signal representing a predetermined minimum angular displacement of said fluid flow from said predetermined flow direction;
   directional threshold detection means responsive to said flow direction signal and direction reference signal for providing a control signal only when said flow direction signal is at least as large as said reference direction signal;
   reversing means responsive to a predetermined rotation of said motor shaft relative to said predetermined direction for automatically reversing the rotation direction of said motor; and
   control means responsive to said control signal for actuating the motor.

2. The apparatus according to claim 1 further comprising delay means responsive to said control signal for delaying actuation of the motor by said control signal until said control signal has been provided for a predetermined continuous amount of time.

3. The apparatus according to claim 2 wherein said predetermined rotation is selectable and further comprising means for selectively adjusting the degree of said predetermined rotation.

4. The apparatus according to claims 1 or 2 wherein said predetermined minimum angular displacement is selectable and further comprising means for selectively adjusting the level of said direction reference signal.

5. The apparatus according to claims 1 or 2 further comprising:
   means for receiving a flow speed signal which is a function of the fluid flow speed;
   reference speed signal means for providing a speed reference signal representing a predetermined minimum flow speed;
   speed threshold detection means responsive to said flow speed signal and said speed reference signal for providing a further signal whenever said fluid flow speed is below said predetermined minimum flow speed; and
   inhibiting means responsive to said further signal for inhibiting actuation of said motor by said control means whenever said fluid flow speed is below said predetermined minimum speed.

6. The apparatus according to claim 5 wherein said predetermined minimum flow speed is selectable and further comprising means for selectively adjusting the level of said speed reference signal.

7. The apparatus according to claim 5 adapted for use with a motor which is provided with brake means for normally preventing motor shaft rotation, said apparatus further comprising means for releasing said brake means to permit rotation of said motor shaft in response to said control signal being provided for a predetermined continuous amount of time.

8. The apparatus according to claim 7, wherein said brake means is released in response to said further signal being provided by said speed threshold detection means simultaneously with said control signal being provided for said amount of time.

9. The apparatus according to claim 7 wherein said predetermined amount of time is selectable and further comprising means for selectively adjusting said predetermined amount of time.

10. The apparatus according to claim 6 further comprising means responsive to deactuation of said motor for actuating said brake means to stop motor rotation at a predetermined time after motor deactuation.

11. The apparatus according to claim 10 wherein said predetermined time is selectable and further comprising means for selectively adjusting said predetermined amount of time.

12. The apparatus according to claims 1 or 2 wherein said reversible motor is a gear motor.

* * * * *